Oct. 27, 1942. M. M. CLOUGH 2,299,913
WORLD CLOCK
Filed Aug. 2, 1940 8 Sheets-Sheet 1

WITNESSES

INVENTOR
Maud M. Clough
BY
ATTORNEYS

Oct. 27, 1942.　　　M. M. CLOUGH　　　2,299,913
WORLD CLOCK
Filed Aug. 2, 1940　　　8 Sheets-Sheet 2

WITNESSES

INVENTOR
Maud M. Clough
BY
Anderson & Liddy
ATTORNEYS

Oct. 27, 1942.   M. M. CLOUGH   2,299,913
WORLD CLOCK
Filed Aug. 2, 1940   8 Sheets-Sheet 3

WITNESSES

INVENTOR
Maud M. Clough
BY
ATTORNEYS

Oct. 27, 1942.    M. M. CLOUGH    2,299,913
WORLD CLOCK
Filed Aug. 2, 1940    8 Sheets-Sheet 4

WITNESSES

INVENTOR
Maud M. Clough
BY
Murry, Anderson & Liddy
ATTORNEYS

Oct. 27, 1942. M. M. CLOUGH 2,299,913
WORLD CLOCK
Filed Aug. 2, 1940 8 Sheets-Sheet 5

WITNESSES
Geo. W. Naylor
A. L. Kitchin

INVENTOR
Maud M. Clough
BY
Munn, Anderson & Liddy
ATTORNEYS

Oct. 27, 1942.   M. M. CLOUGH   2,299,913
WORLD CLOCK
Filed Aug. 2, 1940   8 Sheets-Sheet 6

INVENTOR
Maud M. Clough
BY
Munn, Anderson & Liddy
ATTORNEYS

Oct. 27, 1942.    M. M. CLOUGH    2,299,913
WORLD CLOCK
Filed Aug. 2, 1940    8 Sheets-Sheet 7

Fig. 14.

INVENTOR
Maud M. Clough
BY
Munn, Anderson & Liddy
ATTORNEYS

WITNESSES

Oct. 27, 1942.  M. M. CLOUGH  2,299,913
WORLD CLOCK
Filed Aug. 2, 1940   8 Sheets-Sheet 8

WITNESSES

INVENTOR
Maud M. Clough
BY
ATTORNEYS

Patented Oct. 27, 1942

2,299,913

UNITED STATES PATENT OFFICE 2,299,913

WORLD CLOCK

Maud Mae Clough, New York, N. Y.

Application August 2, 1940, Serial No. 349,703

19 Claims. (Cl. 58—44)

This invention relates to an improved clock and has for an object to provide an improved construction which will present a map of the entire world with illuminating and indicating means for indicating the time of day in all parts of the world and also indicating the parts of the world which are light and the parts which are dark.

Another object of the invention is to provide an improved clock displaying a flat map of the earth with means controlled by a master clock for indicating the time of day and also the minutes of the hour at all points on the earth simultaneously.

A further object of the invention is to provide a world clock presenting a partly transparent or partly translucent map of the world and distinctively contrasting means arranged in back thereof for illuminating the map at the place which is being lit by the sun on the earth, with means for moving the illumination successively to indicate the travel of the earth with respect to the sun, and showing how the light of day travels from east to west.

In the accompanying drawings—

Figure 5:
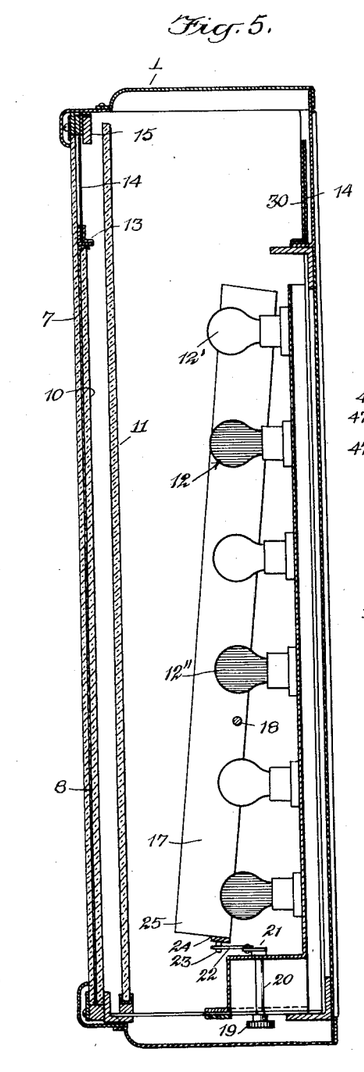
Fig. 5 is a sectional view through Fig. 1, approximately on the line 5—5.

Referring now more particularly to the drawings, it will be apparent that there is shown a casing 1, which may be constructed of any suitable material or combination of materials, and said casing has a window opening 2. Superposed on the casing is a supplemental casing 1' and a glass panel 7 supported by the casing closes the window opening 2. Behind the panel 7 is a map 8 of any suitable sheet material showing the entire world, on which vertical lines 9 indicate the twenty-four zones of standard time around the world. The map 8 is held in place by a backing 10, preferably of glass, so that the map will be held flat. Another glass panel 11 is spaced from the backing 10 so that the heat from a bank of lamps 12 will not injuriously affect the map. A pair of angle members 13 extend horizontally behind the panel 7 above the map 8. The upper edge of the map 8 is held between one of the angle members 13 and the upper edge of the panel 10, as shown in Fig. 5. The members 13 constitute a guide for the lower edge of an hour strip or tape 14 which also has the upper edge guided by a horizontally disposed strip 15 secured to the opposite ends of the casing within the same. It will therefore be understood that the tape moves within the casing 1 directly behind the panel 7 above the map 8. The tape 14 moves to the left across the twenty-four standard zones defined by the lines 9, at the rate of one time zone an hour indicating the hour for each zone. The tape 14 moves one step each hour which is equal to the distance from the centers of adjacent numerals designated 16 in Fig. 1. These numerals 16 embrace those from "1" to "12" in two groups representing A. M. and P. M. The tape 14 may be made of any suitable material, such as paper, linen, or paperized fabric, and the numerals 16 are formed of perforations in the tape 14. The words "New day" and "Old day" consist of perforations in the tape 14. The provision and arrangement is such that when it is twelve o'clock noon of a new day in the Rocky Mountain region, a central area of the map consisting of the distance between thirteen time zones will be illuminated by the white light of some of the lamps 12, while the remaining portion of the map at the left of the central area will be illuminated by the light emanating from blue lamps of the bank of lamps 12 and the remaining portion of the map at the right of the central area will be lighted by the blue light emanating from the remaining lamps 12. The light emanating from the lamps 12 will brightly illuminate the central portion of the map corresponding to that portion of the earth which would be illuminated in reality by the sun at the same time. The western part of Europe and the eastern part of Asia as represented by the left-hand end and right-hand end of the map are both shown dark as would occur at these places when it is noontime in the Rocky Mountain region of the United States. In order to simulate daylight and darkness, the bank of lamps 12 consists of clear lamps 12' and blue lamps 12". There are twenty-four rows of lamps corresponding to the twenty-four standard time zones. Each row of lamps consists of six lamps, there being three clear lamps 12' and three blue lamps 12".

Figure 7:
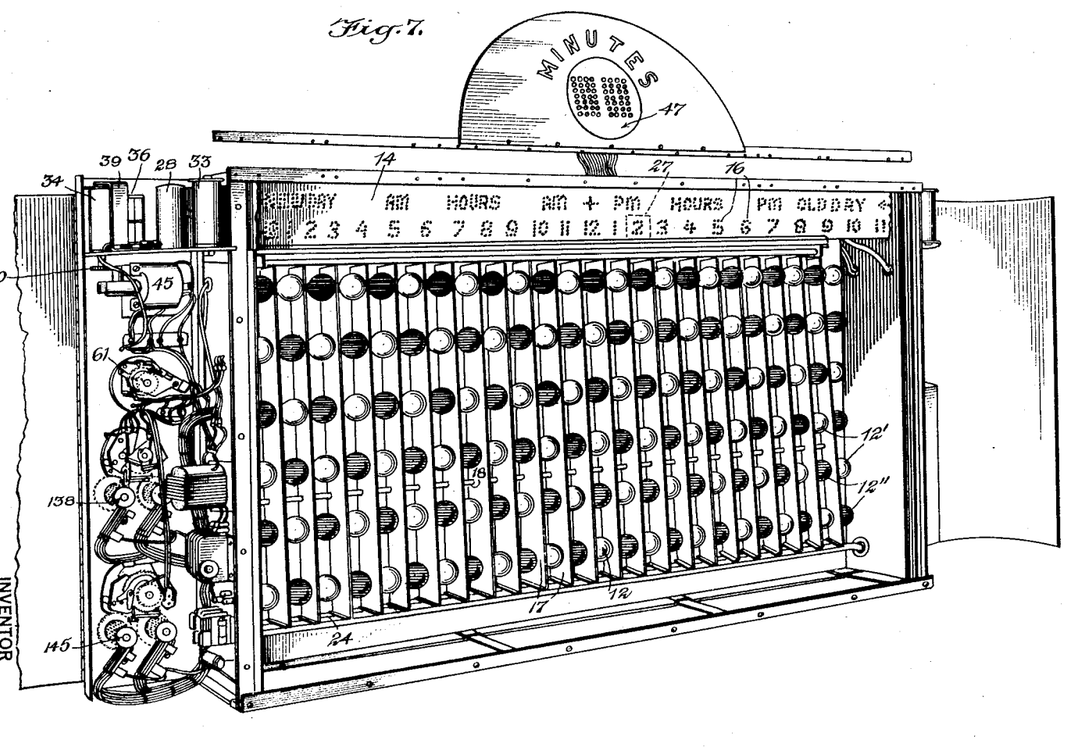
Fig. 7 is a front perspective view of the interior of the clock with the front shown in Fig. 1 removed.

At certain times of the year in accordance with the orbital movement of the earth, there is more light in twenty-four hours than darkness and to take care of this condition there is provided light variation means consisting of vertical diffusion plates 17 appearing most clearly in Figs. 5 and 7. The plates 17 are arranged between the rows of lamps. In order to adjust these plates with respect to the lamps, there is provided manually operable mechanism including a horizontal pivot rod 18 which extends transversely through the plates 17 and whose opposite ends are connected in any suitable manner with portions of the casing 1. The rod 18 is connected with each of the plates 17 so that they will swing in unison. A manually operable control member 19 is connected with a shaft 20 carried by the casing 1. An arm 21 is secured to the upper end of the shaft 20. A link 22 has the opposite ends thereof pivotally connected with the arm 21 and a pin 23 respectively. The pin 23 is carried by a horizontally disposed bar 24 secured to the lower ends of all the plates 17. When the plates 17 are disposed as shown in Fig. 5 and white light is emanating from the lamps 12' a diffusion of the light is secured to correspond to daytime at its maximum in the Northern Hemisphere and at its minimum in the Southern Hemisphere. When daytime is more than twelve hours, the control member 19 is moved to adjust the plates 17 so as to gradually lower the ends 25. This will slightly raise the opposite ends so that eventually the clear or white lamps 12' will give the same amount of diffusion and the lighted portion of the map 8 will cover more than it does when the plates 17 are tilted as shown in Fig. 5. As the seasons change the plates 17 are adjusted by manipulating the control member 19. The plates 17 are so connected and disposed that they constitute an assemblage whose upper portion and, to a lesser extent the lower portion, may be moved in and out. In April the upper part of the assemblage is pushed in as far as possible so as to allow the white light in the upper part of the casing to spread so as to give longer twilight and shorter night simulation. In September the assemblage will be set for even distribution of the light, and in December the assemblage will be set with the top portion out as far as possible to make the night simulation for the Northern Hemisphere as long as possible.

Figure 2:
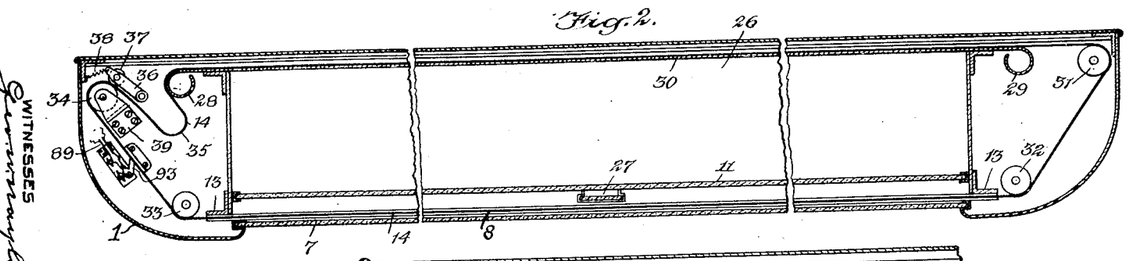
Fig. 2 is a sectional view through Fig. 1 approximately on the line 2—2.
Figure 3:
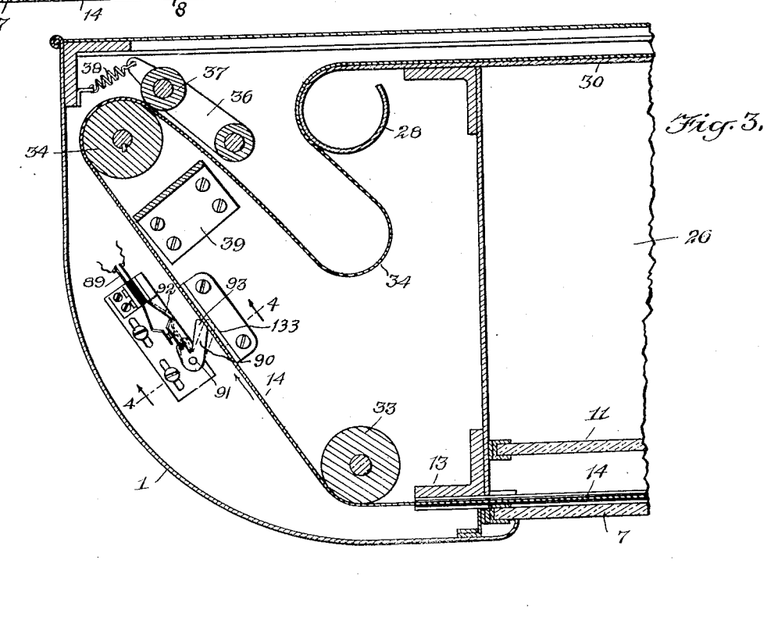
Fig. 3 is an enlarged sectional view of the left-hand end of the structure shown in Fig. 2.
Figure 4:
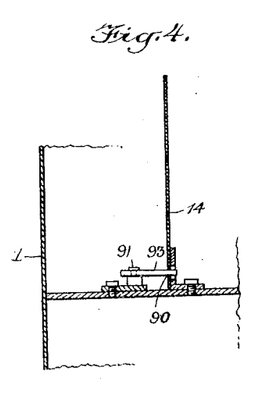
Fig. 4 is a detail fragmentary sectional view through Fig. 3, approximately on the line 4—4.
Figure 15:
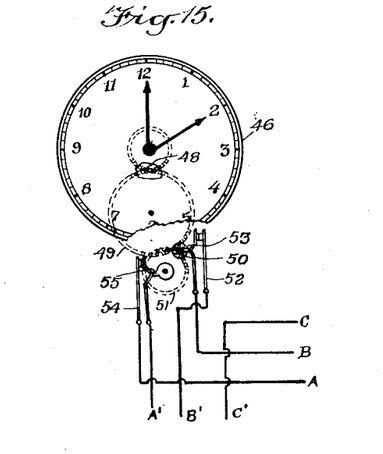
Fig. 15 is a front elevation of a standard clock having switch mechanism associated therewith for turning on electrical impulses to certain circuits shown in Fig. 13.

In order to move the tape 14 one step each hour, with respect to the map 8 to indicate a change in time, there is provided clock-operated electromagnetic means and also mechanical means as follows. The tape 14 passes around the curled ends 28 and 29 of a guide plate 30 made preferably of sheet material, such as metal or any other suitable material. The plate 30 is near the rear of the casing 1 and is secured therein in any suitable manner. At the right-hand end of the casing 1, as shown in Fig. 2, there is a loosely mounted guide roller 31 and near this roller is a second loosely mounted guide roller 32. These rollers 31 and 32, together with the curled plate 30, guide the tape 14 in its travel through the members 13. A freely rotatable idler roller 33 is arranged at the outlet end of the guide formed by the members 13 and from the roller 33 the tape extends over a power roller 34 and thence forms a loop 35. From the loop 35 the tape is pulled toward the roller 31 around the curled end 28 and in contact with the plate 30 to the roller 31 and from the latter to the roller 32. In order to press the tape 14 against the roller 34 and thereby provide ample friction for accurately moving the tape, there is provided a pivotally mounted bar 36 which carries a freely rotatable roller 37. A retractible spring 38 has one end thereof connected with the bar 36 and its other end connected with a portion of the casing 1 in order to cause the roller 37 to press the tape against the roller 34 for the purpose stated, as shown most clearly in Fig. 3. The roller 34 is mounted on a suitable bracket 39 and turns once each hour for moving the tape 14 a distance equal to one of the time zones defined by the lines 9 and represented by the numeral 16. The roller 34 is keyed or otherwise rigidly secured to a gear 40 which meshes with a pinion 41 rigidly secured to a shaft 42 having rigidly secured thereto a worm gear 43. A worm 44 which meshes with the gear 43 is rigidly secured to the armature of a driving motor 45. The motor 45 operates once each hour to drive the tape forward one hour. It takes about four seconds to advance the tape one step. The current which is supplied to the motor is controlled by a master clock 46 shown in Fig. 15. The clock mechanism includes a gear wheel 48 which meshes with a gear wheel 49 which meshes with a pinion 50. The pinion 50 meshes with a large gear wheel 51. The proportions of the gears are such that the pinion 50 will make one rotation each minute and the gear wheel 51 will make one revolution each hour.

The switch 52 is actuated by a pin 53 on the pinion 50. The pin actuates the switch each minute and holds the same closed momentarily. A switch 54 is actuated by a pin 55 on the wheel 51 once each hour and holds the switch 54 closed momentarily. Current supply wires A and B are electrically connected with switches 54 and 52, respectively, to one terminal thereof, and current output wires A' and B' are connected, respectively, with the remaining terminal of the switches 54 and 52. It will be seen that current passing through wire B' passes to a post 56 and will divide at this place so that part will pass through a wire 57 and through contacts 58 to a point 59 and some passing to the winding 60 of a relay 61. A common return wire consisting of portions C and C' causes return flow of current from elements fed by the wires A' and B'. A current supply of 110 volts power is split so as to make available 100 watts of constant service for driving the clock, and also for furnishing power to drive the motor. The motor is driven once each hour by provision in the tape 14 of elongated apertures or slots S. These slots are spaced equidistantly a distance equal to the distance from the center of a numeral 16 to another in order to cause current to flow periodically every hour in response to the movement of the tape. The tape 14, by reason of the slots S, cooperates with a switch 89 shown in Figs. 3 and 13. This switch is self-opening. One arm of the switch 89 is connected with a bell crank lever 90 pivotally mounted as at 91. The other arm 92 of the switch is resilient and has a continuous tendency to move to open position so that when it acts on the lever 90 it will have a tendency to force the lever toward the tape 14. When the tape 14 moves to bring a slot S in registry with the end 93 of the lever, the lever will move on its pivot under the influence of the arm 92 bringing the end 93 against an abutment 133, thereby opening the switch 89 and shutting off current. When the tape 14 has been moved slightly to advance the slot S, which allows the switch to open itself, the tape will act on the end 93 of the lever 90, causing the same to bear on the arm 92, thereby closing the switch 89. A 50-ohm resister unit 107 is connected across the motor brushes by wires 124 and 133, respectively, to slow down the speed of the motor and give it the characteristics of a shunt-wound motor. This is desirable to keep the speed of the motor slow so that it can be stopped quickly when the end 93 of the lever 90 enters a slot S in the tape 14.

Figure 17:
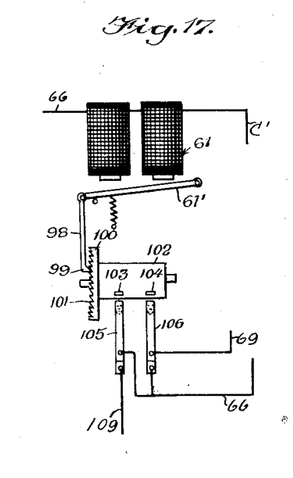
Fig. 17 is a detail view partly in elevation and partly in diagram showing more in detail the construction of the relay illustrated near the upper left-hand corner of Fig. 13 and particularly illustrating how current is supplied to the motor.

At each hour of the clock, the wheel 51 will cause the pin 55 to close the switch 54 to cause current to flow from supply wire A to A'. At the same time, by reason of the pin 53 on wheel 50 closing switch 52, current passing from the wire B' will pass through winding 60 to energize the relay 61, causing a contact 62 to engage a contact 63 so that the relay 61 remains energized by the current from wire A' to keep contacts 62 and 63 in engagement with each other. From Fig. 17 it will be apparent that when the relay 61 is energized it will attract an armature 61' to pull on an arm 98. The arm 98 has a hook end 99 coacting with a disk 100 having sixty ratchet teeth 101. The disk 100 is rigidly secured to one end of a drum 102. The armature 61' moves once each minute and, therefore, will give the drum 102 a complete rotation once every hour. The drum 102 has cams 103 and 104 mounted thereon in axial alinement, the cam 103 coacting with a switch 105 having contacts 68 and the cam 104 coacting with a switch 106 having contacts 67. The switches 105 and 106 are connected by the point 59, winding 60 and a wire 66 with the common return wire C. The switch 106 is connected with the winding of a relay 70 by a wire 69 so that whenever current passes through the switch 106 the relay 70 will be energized. The wire 109 is electrically connected with a wire 75 leading to the relay 77, the energization of which furnishes current to the motor 45. When the relay 61 is energized it will close switches 105 and 106 through the intervention of parts 61 and 98 to 104, completing a circuit through 69, 70, 71 to C' from A'. A circuit will also be completed from A', post 64, wire 65, contact 63, contact 62, wire 66, contacts 67, wire 69, relay 70, wire 71, to return wire C', thus energizing the relay 70. The relay 61 being energized in the manner described current will pass from the switch 105, through post 74, wire 75, windings 76 of relay 77, wire 78, post 72, wire 73, to the return wire C'. Thus the relay 77 will be energized. The motor 45 is first operated to give the hour tape 14 an initial movement at each hour when the switch 54 is closed by the pin 55 causing the energization of the relay 77 in a circuit as follows. (See Figs. 13 and 15.) Current flows from switch 54 through wire A', post 64, wire 65, contact 63, contact 62, relay 61, (energized by the closing of the minute switch 53), wire 66, switches 106 and 105 (closed by parts 61 and 98—104), wire 109, post 74, wire 75, coil 76, wire 78, post 72, wire 73 to the common return C'. The relay 77 is thus energized which will cause the contacts 79 to engage each other, thereby closing another circuit as follows. Current flows from the low side of the transformer 80, through wire 80', contacts 79, wire 81, rectifier 82, wire 84, post 85, winding of the motor 45, wire 86, post 87, wire 88 back to the rectifier 82 whose other terminal is connected by a wire 83 with the other terminal of the low side of the transformer 80. Therefore, the motor 45 will start running causing the movement of the tape 14 which will close the switch 89. This will close a circuit as follows. Current will flow from the rectifier 82, through wire 84, post 85, winding of the motor 45, wire 86, post 87, wire 94, switch 89, wire 95, relay 96, wire 97 back to the rectifier 82. The relay 96 being energized will cause current to continue to flow from the low side of the transformer 80 to the rectifier to supply the motor 45 in a circuit completed by the contacts of the relay 96; and such last circuit, including wire 80', contacts of the relay 96, wire 81, rectifier 82, wire 84, post 85, winding of the motor 45, wire 86, wire 88, rectifier 82, wire 83 back to the transformer 80. This gives sufficient direct current power to operate the motor 45 to run approximately four seconds to advance the tape 14 one step or until the next slot S registers with the end 93 of the lever 90, thereby resulting in the opening of the switch 89, deenergization of the relay 96 and separation of its contacts to shut off the power from the transformer 80. The tape 14 will stop moving and dwell approximately for one hour to indicate an hour change in time with respect to the twenty-four time zones defined on map 8 by the lines 9. It will thus be understood that the tape moves to the left, when viewed from the front, one step so as to change the position of the numerals 16 to advance the time one hour in accordance with the passing of a day or, in other words, corresponding to the passage of daylight from east to west according to the rotation of the earth with relation to the sun. The numerals 16 correspond and register each time with the time zones defined by the lines 9, so that it is possible to tell the hour in conjunction with the legends "New day" "A. M.," "P. M." and "Old day" "P. M." and "A. M." at each of the time zones.

In order that the symbols or legends perforated in the tape 14 may be more readily readable at all times, the light emanating from the lamps 12 arranged in the main space 26 of the casing 1 passes through the panel 11, through the perforations formulating the symbols or legends in the tape 14 and through the panel 7. If desired, a red or other color glass panel 27 may be mounted on the panel 11 between the latter and the opening 2. The panel 27 is preferably red to render the symbols or legends readily distinguishable and is arranged in the time zone in which the clock is exhibited. If the clock is used in the city of New York, the red panel 27 would be in the Eastern Standard Time zone, as shown in dotted lines in Fig. 1 and would be behind the numeral "2" on the tape 14.

Figure 6:
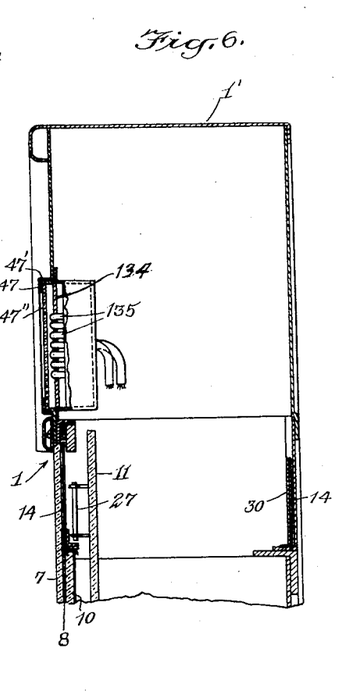
Fig. 6 is an enlarged fragmentary sectional view through Fig. 1 approximately on the line 6—6.

In order to give the time in minutes in conjunction with the hour tape 14, there is provided visual indicative means as follows. Groups of lamps 3 and 4 are arranged within the casing 1' to formulate numbers indicating minutes. The lamps 3 and 4 appear through the front opening 47 in the casing 1', the same being a circular opening for that purpose, surrounded by a ring 47' which supports a transparent panel 47" closing said opening. Behind the panel 47" is an opaque panel 134, preferably of metal, and through apertures in the panel 134 the lamps 3 and 4 project. The lamps 3 and 4 have elongated bulbs 135, as shown in Fig. 6. Each group of lamps 3 and 4 contains twenty-eight lamps. The lamps in group 3 formulate numbers representing "tens" and the lamps in group 4 represent "unit" or "digits." The "tens" are designated by the numeral 5, whereas the "units" are designated by the numeral 6. These lamps 3 and 4 appear most clearly in Figs. 1, 13 and 14. It is to be understod that the group of lamps 3 formulates "0" and the numerals "1" to "5," inclusive, in succession, whereas the group of lamps 4 formulates "0" and the numerals "1" to "9," inclusive, in succession. In other words, when starting, the lamps in each group will start with "0" and the next minute the lamps in group 4 will formulate the numeral "1," then "2," then "3," &c., up to and including the numeral "9," after which the lamps 4 formulate "0" and the lamps 3 will then change from "0" to the numeral "1," thereby indicating ten minutes. The lamps in group 4 change once every minute, whereas the lamps in group 3 change once every ten minutes. It will therefore be understood that the groups of lamps 3 and 4 formulate two "0's" at the hour and, in succession, the minutes from "1" to "59," inclusive, followed by the formulation of the two "0's." The change in the lighting of the lamps in groups 3 and 4 to indicate the minutes is initiated by the clock-operated switch 52. The minutes formulated by the lamps 3 and 4 are observed in conjunction with the numerals 16 on the hour tape 14. As explained hereinabove, the tape 14 moves once each hour and this occurs in approximately four seconds to advance the tape the required distance. The movement of the tape once each hour is initiated by the clock-operated switch 54. For the remainder of the hour the tape dwells during which the minutes are formulated by a change in the lighting of the lamps 3 and 4. The tape 14 is of sufficient length to display the ordinals 16, denoting twenty-four hours, through the opening 2, and those ordinals denoting the other thirty-six hours will occur within the casing 1 at the ends and back thereof.

Figure 13:
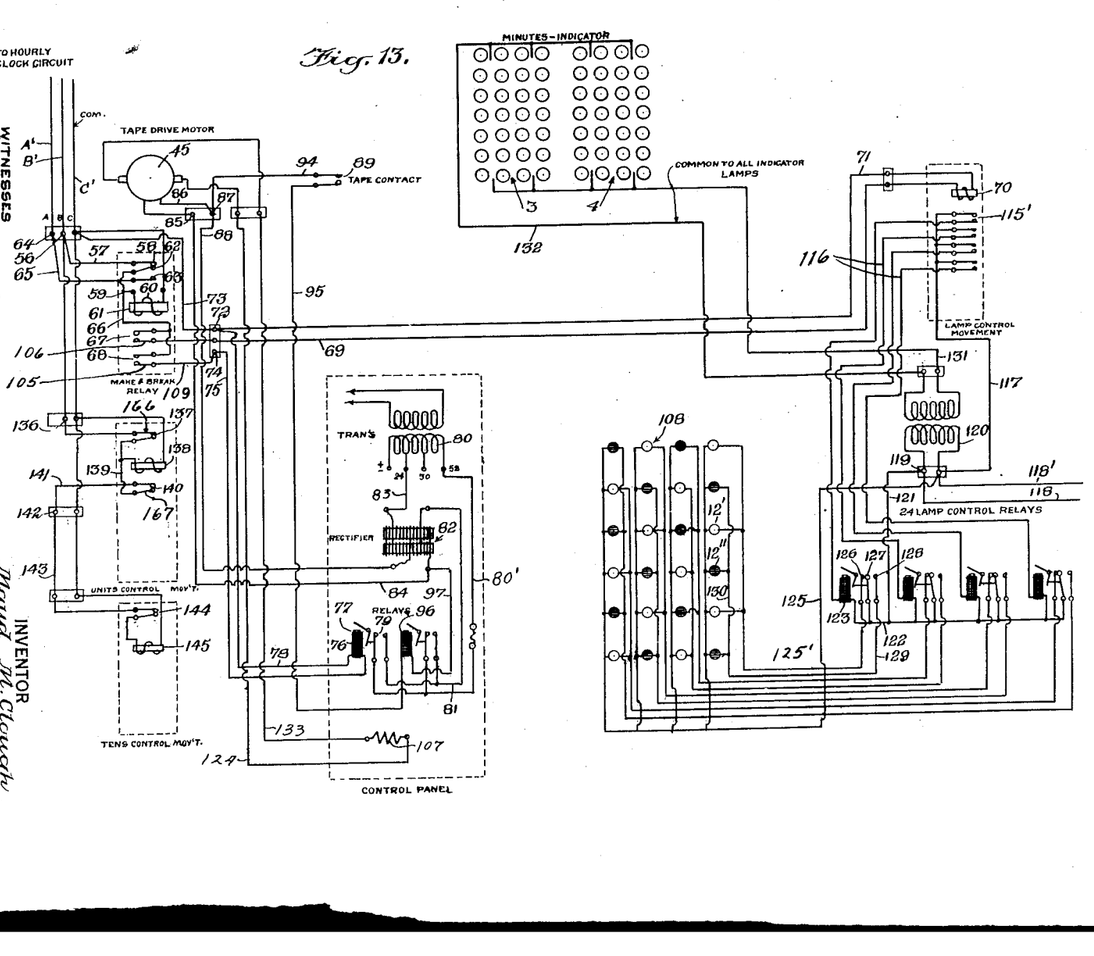
Fig. 13 is a diagram of the wiring of the lamps shown in Fig. 7 and the lamps forming minute signs shown in Figs. 1 and 7.

Relays 138 and 145 control the groups of lamps 4 and 3, respectively. Each relay 138 and 145 responds to each impulse sent by the clock-operated minute switch 52, but the relay 138 effects a change in numbers once every minute, whereas the relay 145 effects a change in numbers once in every ten minutes. Current flows from one side of the switch 52 through wire B' to post 136, contacts 137, wire 139, contacts 140, wire 141, post 142, wire 143, contacts 144, windings of the relay 145, and then back to the common return C'. The wire 139 is connected with the windings of the relay 138 and said windings are connected with the common return C' as shown in Fig. 13. The relay 145 operates to control the lighting of lamps 3 to formulate the "tens" numbers "1," "2," "3," "4," and "5," as well as "0," whereas the relay 138 operates to control the lighting of the lamps 4 to formulate the "units" numbers "1," "2," "3," "4," "5," "6," "7," "8," and "9," as well as "0." For the sake of convenience and to eliminate repetition, a description of the relay 145 and its counterparts will suffice for both relays and the obvious difference in the relays will be explained hereinafter.

Figures 8, 9, 10, 11, 12:
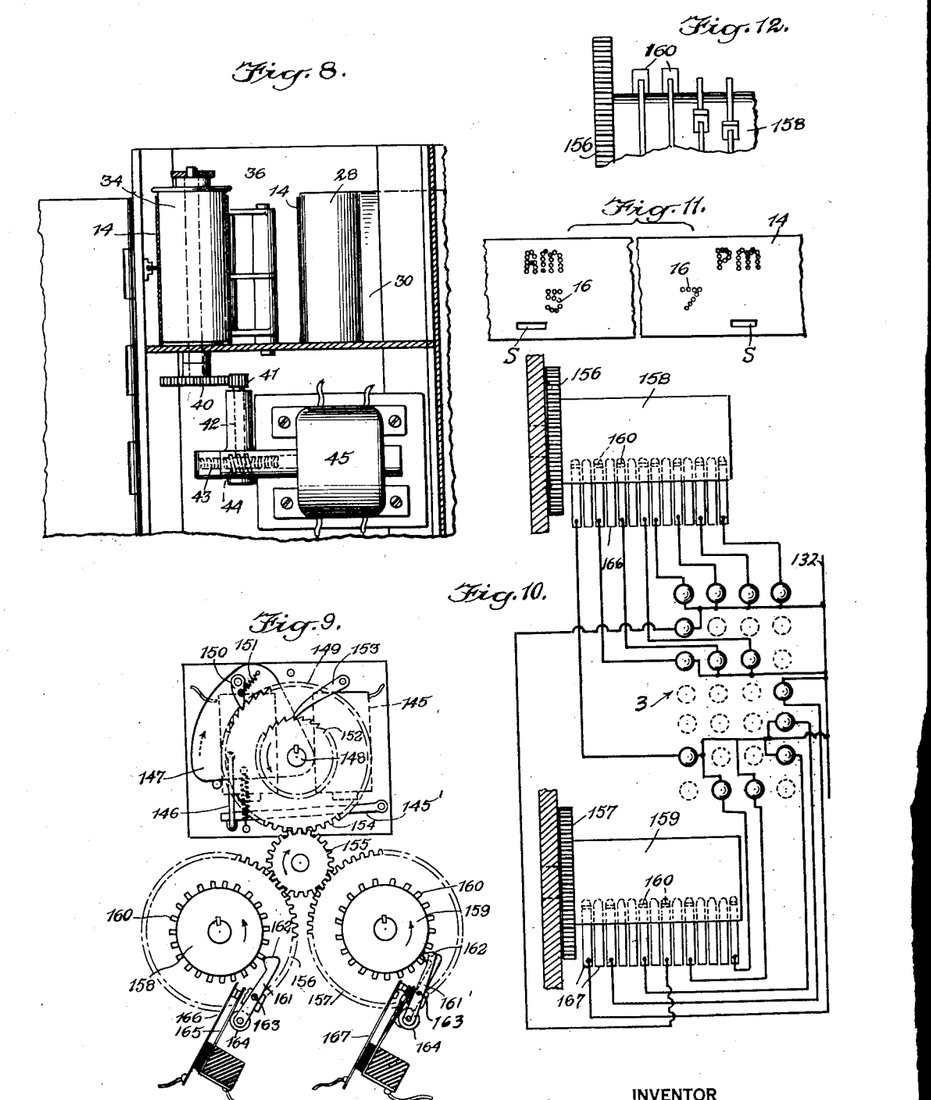
Fig. 8 is a fragmentary sectional view showing the motor, tape-propelling mechanism and associate parts shown at the left in Fig. 7.
Fig. 9 is a detail elevation of one of the relays shown at the lower part of Fig. 7 at the left and embodying certain features of the invention.
Fig. 10 is a diagram showing the action of the relays of Fig. 9 and the way the same turns on current to the lamps forming the minute signs.
Fig. 11 is a fragmentary side elevation of part of the belt or tape shown in Figs. 1 and 7 and illustrating notches embodying certain features of the invention.
Fig. 12 is a fragmentary side view of one of the drums shown in Fig. 9 and illustrating how the lugs or cams are spaced apart to secure certain results.

Referring now to Figs. 9, 10 and 12, it will be apparent that the relay 145 has an armature 145', and when the magnets of the relay function the armature will be attracted and will push a link 146 upwardly. The link 146 is pivotally connected with the armature 145' and is also pivotally connected with a segmental plate 147 pivotally mounted on a pin or shaft 148. A ratchet wheel 149 is fast on the shaft 148 and a pawl 150 is pivotally mounted on the plate 147 and is constantly influenced by a spring 151 so that the pawl 150 will always move into any one of the teeth of the ratchet wheel 149. A small ratchet wheel 152 is fast on the shaft 148 and coacts with a gravity-actuated pawl 153 which functions to prevent the ratchet wheel 149 from moving in a reverse direction. The ratchet wheel 149 is bolted or othewise secured to a gear wheel 154 to rotate therewith. The ratchet wheel 149 has sixty teeth so that there will be one tooth for each minute interval which the pawl 150 moves the wheel 149 upon one impulse. An idler 155 transmits motion from the wheel 154 to gear wheels 156 and 157, so that they will move in timed accord with the movement of the ratchet wheel 149. The wheels 156 and 157 are mounted on the ends of drums 158 and 159, respectively, so that the wheels may rotate the drums in unison. These drums conjointly are provided with six sets of cams 160, and each set contains the required number of cams to formulate a particular figure or the "0." The cams on each drum are spaced equidistantly axially of the drum. A pawl 161 is associated with each cam and the pointed end 162 thereof cooperates with the cam. Each pawl 161 is pivotally mounted by means of a pin 163 and carries a roller 164 which presses against a spring arm 165 of a switch 166 and a switch 167. When the end 162 is resting on one of the cams 160, the switch 166 or 167, as the case may be, will be closed. When the end 162 of each pawl is between two of the related cams, it will allow the switch 166 or 167, as the case may be, to open. It will thus be understood that the drums 158 and 159 and their cams and other counterparts 161—167 operate conjointly to control the lighting of the lamps 3 to formulate the "tens" numbers "1" to "5" inclusive, as well as "0." The six sets of cams 160 of the drums 158 and 159 are so arranged that one set functions in conjunction with the related pawls 161 every sixth of a revolution of the drums, or, in other words, in response to every tenth impulse transmitted by the closing of the clock-operated switch 52. The relay 138, which controls the lighting of the lamps 4 to formulate the "units" numbers "1" to "9" inclusive, as well as "0," is similar to the relay 145 in every respect except that the drums of the relay 138 are provided with sixty sets of cams 160 instead of six sets of cams as on the drums of the relay 145. In other words, the cams on the drums of the relay 138 function once every sixtieth of a revolution in response to each impulse sent by the closing of the switch 52 by the master clock 46 each minute. Some of the cams 160 of each set are arranged on one drum and the remainder of the set are arranged on the other drum to actuate their respective switches 166 and 167 upon the conjoint movement of the drums. Two drums are used for the sake of convenience and compactness, but obviously the sets of cams 160 may be arranged on a single drum.

Figure 14:
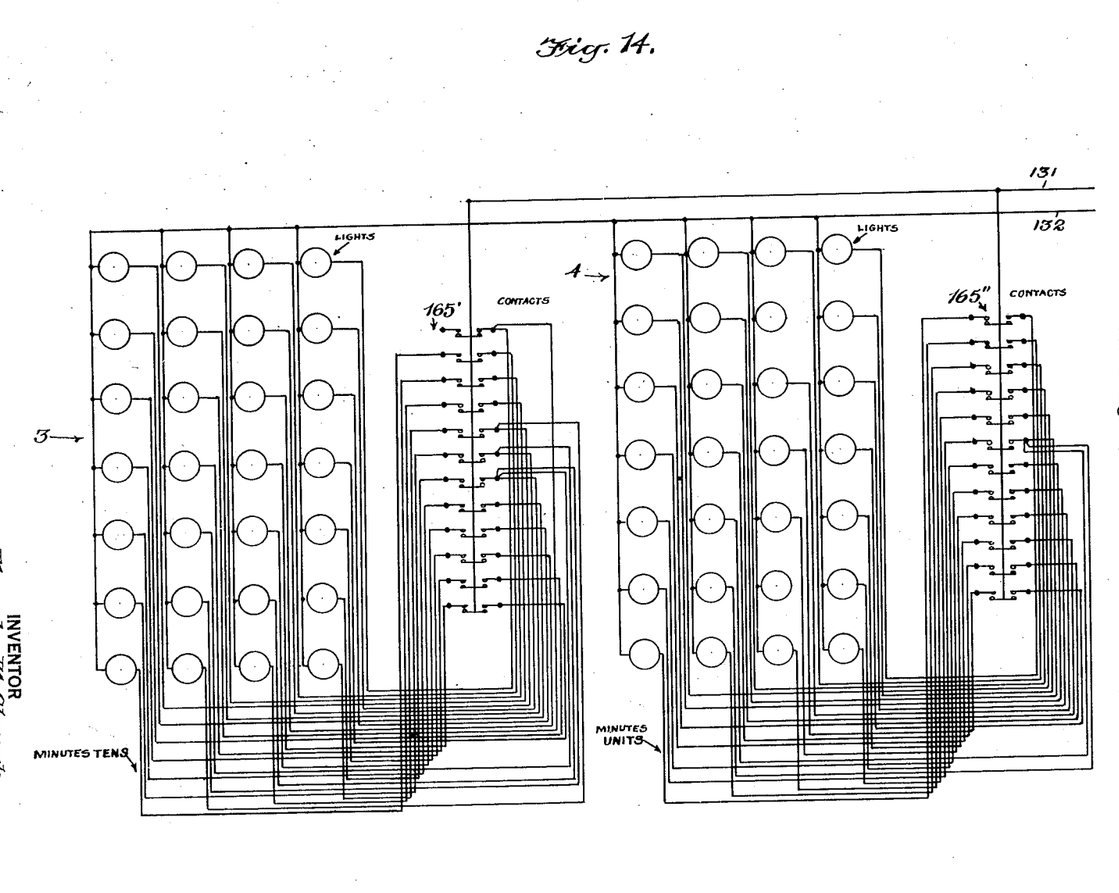
Fig. 14 is a diagram showing the circuit for the lamps forming the minute signs shown in Fig. 7, together with switches for turning on and off the individual lights to change from one number to another.

The switches 166 and 167 whose contacts 165' and 165" appear in Fig. 14, are connected in parallel with the wires 131 and 132 and the lamps 3 and 4 are likewise connected in parallel with said contacts and wires. The wires 131 and 132 are connected with the terminals, respectively, of the low side of a transformer 120. A wire 118 supplies current to one terminal of the high side or primary winding of the transformer 120 and a return wire 118' is connected with its other terminal. The transformer 120 reduces the voltage to twenty-four volts and the resistance in the line is such that small lamps may be used in groups 3 and 4, as, for instance, lamps taking two or three watts.

Figure 1:
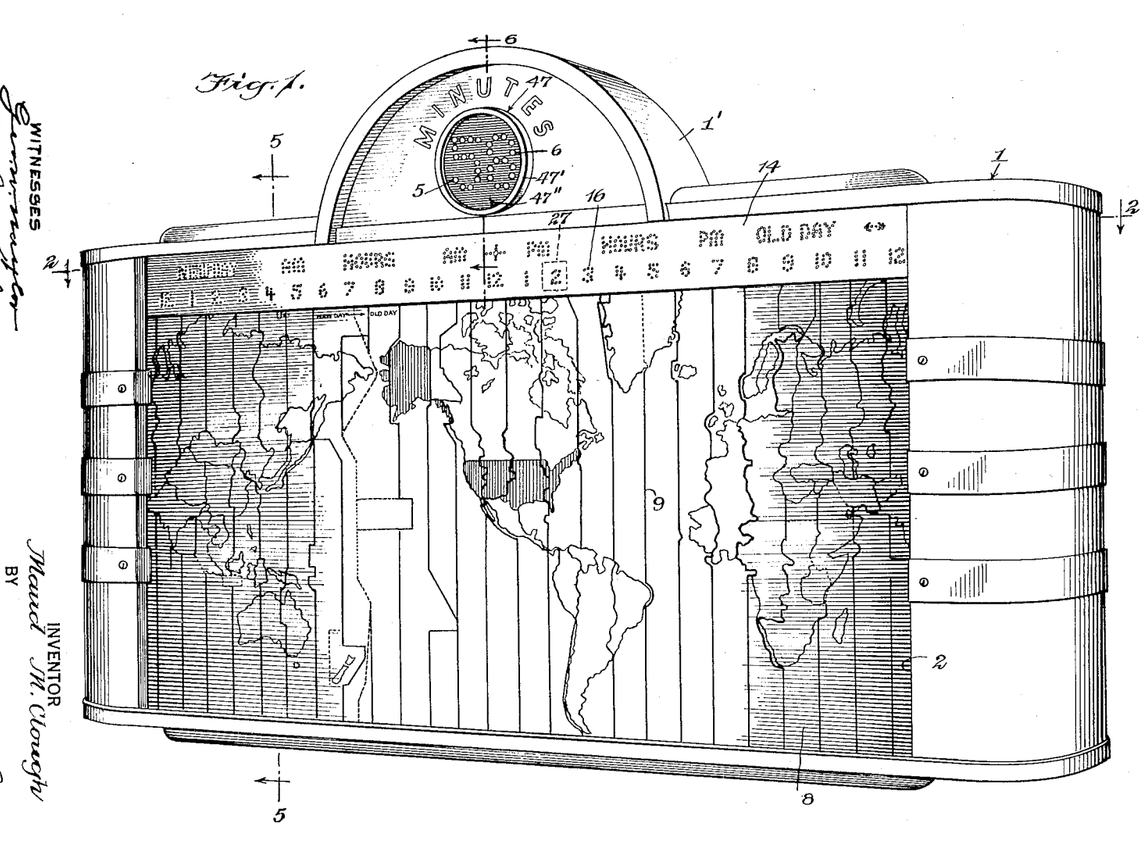
Fig. 1 is a perspective view of the complete world clock disclosing an embodiment of the invention.

As shown in Fig. 10, certain switches 166 and 167 are closed to supply current to certain of the lamps in group 3 to form the numeral "5" to correspond to the showing in Fig. 1. In Fig. 1 the numeral "8" is formulated by the lamps 4. Thus the number "58" is exhibited, which in conjunction with the hour indications on the tape 14, could be read "12:58 A. M." or "12:58 P. M"; "1:58 A. M." or "1:58 P. M." an hour later, &c.

Figure 16:
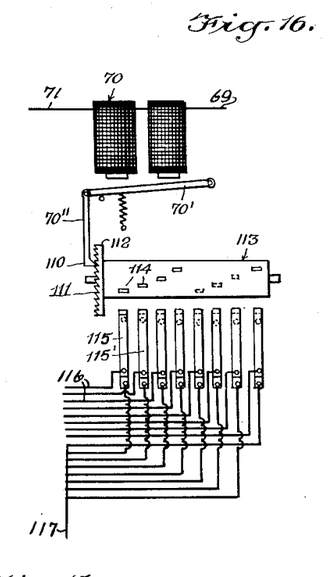
Fig. 16 is a view partly in elevation and partly in diagram, showing more in detail the construction of the relay illustrated at the upper left-hand corner of Fig. 13.

As described hereinabove, the energization of the relay 61 causes the contacts 62 to move into engagement with the contact 63, and through the intervention of the parts 98—104, the switches 105 and 106 will be closed. The closing of the switches 106 will allow current to flow from the wire A, through wire 65, contact 63, contact 62, wire 66, contacts 67 of switch 106, wire 69, relay 70, wire 71, to the common return thereof. The energization of the relay 70, shown in Fig. 16, causes its armature 70' to actuate an arm 70". This arm has a hook 110 adapted to coact with a ratchet surface 111 formed on a disk 112 fixedly secured to one end of a drum 113 to rotate therewith. On the drum 113 are arranged cams 114 in the proper order in which the various rows of lamps 12 are to be lighted. These rows of lamps 12 are designated 108. Inasmuch as there are twenty-four rows 108 of lamps 12, use is made of twenty-four switches to correspond therewith. The reference numeral 115 is arranged to designate thirteen of these switches and the numeral 115' is used to designate the remaining eleven switches. In Fig. 13 only four of these switches are shown, and in Fig. 16, by way of example, only eight of these switches are shown co-operating with eight cams 114, respectively. Each switch 115 and 115' is connected to a wire 116 which is connected to the winding of a relay 123, said winding being also connected with a common wire 122. The other terminal of each of the switches 115, 115' is connected by a return wire 117 with the return wire 118'. It is to be understood that there are twenty-four lamp-control relays 123 corresponding to the twenty-four rows 108 of lamps 12. Each relay 123 actuates a double-acting switch consisting of a resilient contact 127 and co-operative fixed contacts 126 and 128. The contacts 127 are normally in engagement with the contacts 126, respectively. The contacts 126 of the relays 123 are connected by wires 125' with the clear or white lamps 12' of thirteen of the rows 108 and with the blue lamps 12" of the other eleven rows, respectively, and the contacts 127 are connected by wires 129 with the blue lamps of thirteen of the rows 108 and with the clear or white lamps of the other eleven rows, respectively. A common return wire 125 leads from all the lamps, both blue and white, in the twenty-four rows 108 to the common return 117 leading to the switches 115 and 115'. A wire 121 is electrically connected with the feed wire 118 at the post 119 and said wire 121 is also electrically connected with the wire 122 common to all of the relays 123 as shown in Fig. 13.

As pointed out hereinabove, the map 8 has the central area lighted or illuminated by the white lamps 12' of thirteen rows, and a darkened area at the left of the central row is darkened by the blue lamps 12" of six rows and a darkened area at the right of the central area is darkened by the blue lamps of the five remaining rows. This occurs at twelve o'clock noon hour as shown in Fig. 1. In simulating the progressive travel of daylight throughout sectors of the earth, only two rows 108 of the lamps will be affected in carrying out the simulation. These two rows of lamps are at the opposite sides, respectively, of that area illuminated by the thirteen intermediate rows of which only the white lamps are lighted. This is caused by the closing of one switch 115 and one switch 115', the switch 115' being for the row at the left to indicate advancing daylight, whereas the switch 115 is for the row at the right to indicate advancing darkness. When the pair of switches 115 and 115' are actuated by the cams 114, respectively, of the drum 113 upon the hourly energization of the relay 70, the related relays 123 will be energized. The contacts 127 of the two relays involved will move out of engagement with their contacts 126 into engagement with their contacts 128, respectively. When the contact 127 engages the contact 126, three white lamps 12' are lighted and simultaneously therewith three blue lamps 12" are put out in the same row at the left side of the map. When the contact 127 engages the contact 128, three blue lamps 12" are lighted and simultaneously therewith three white lamps 12' are put out in the same row at the right side of the map. In Fig. 13, by way of example, only four lamp-control relays 123 of a total of twenty-four have been shown and have the contact members 127 thereof in engagement with the contacts 126, respectively, and are among those which furnish white light to the thirteen rows which light the central area and blue light to the end areas appearing in Fig. 1. It is to be understood that after a period of twelve hours there will be a reversal of the lighting effect in which the central area will be illuminated by only the blue lamps in eleven rows of lamps to darken the central area of the map, and only the white lamps of seven rows at the left of the central area to simulate daylight in eastern Asia, and only the white lamps of the six remaining rows at the right of the central area to simulate daylight in western Europe and Africa. It is therefore to be understood that at all times there will be thirteen of the rows 108 of lamps emanating white light from the white lamps thereof and eleven rows 108 emanating blue light from the blue lamps 12″ thereof.

In accordance with the movement of the tape 14 to indicate a change in time at various points on the map, the lamps 12′ and 12″ are selectively lighted and extinguished by virtue of the energization of the relay 70. This relay 70 is energized once each hour upon closing of the switch 54. When the relay 70 is energized it causes the drum 113 to rotate one step through the intervention of the parts 70′—112, causing two cams 114 to actuate the respective switches 115 and 115′. The closing of each of these switches causes a circuit to be closed through wire 118′, wire 117, switch 115 or 115′, and wire 116, energizing the respective relay 123, which will cause the engagement of the contact 127 with the contact 128 to close the circuit from the wire 118 through post 119, wire 121, wire 122, contact 127, contact 128, wire 129, through lamps 12″, wire 125, to the common return wire 118′. At the same time that these blue lamps are lighted in the particular row, the white lamps therein will be put out, because of the disengagement of the contact 127 with the contact 126. Twelve switches 115 and their relays 123 light white lamps and put out blue lamps, and twelve switches 115′ and their relays 123 light blue lamps and put out white lamps. In this manner, the map 8 will be illuminated to simulate the gradual changes in daylight and darkness throughout the planet Earth which results from the axial or orbital movement of the earth with respect to the sun.

I claim:

1. A world clock including a casing having a window, a map of the world positioned to extend across said window, rows of lamps positioned in said casing in back of said window for illuminating said map, means automatically functioning to turn on and off current to said rows of lamps in succession, said means functioning each hour so as to give the semblance of the lumination of the map as moving westward at the rate of speed of the rotation of the earth, and an hour tape positioned to move along the upper edge of said map.

2. A world clock as set forth in claim 1, in which the hour tape is formed with spaced numbers representing the hours of the day, and means at the top of the casing presenting numbers indicating the minutes of each hour, and automatically functioning means for changing said numbers each minute.

3. A world clock as set forth in claim 1, in which a minute face is provided at the top of said casing, said minute face having two groups of electric lamps for indicating units and tens, and automatically functioning means for switching the current in the units group each minute and in the tens group each ten minutes for correctly showing at all times the minutes of each hour.

4. A world clock including a casing having a window, a map of the world positioned in said window, an hour tape at the upper edge of said map having spaced numbers thereon indicating the hours and means for moving said tape so that the numbers on the tape will move from the eastern part of the map toward the western part, said means including a plurality of guiding rollers positioned in said casing adjacent each end thereof, a driving roller for said tape at one end of the casing, means for providing friction between said driving roller and said tape, an electric motor for driving said driving roller and a clock-controlled circuit for said motor, said circuit supplying current to said motor for a short time at the end of each hour for actuating the same sufficiently to cause said driving roller to move said tape a distance indicating one hour.

5. A world clock as set forth in claim 4, characterized by said tape having aligned spaced slots, a pivotally mounted bell crank lever positioned so that one arm thereof is adapted to move into one of said slots at the beginning of each hour, and a switch interposed in the circuit of said motor formed with a spring switch section continually urging said bell crank lever to a position with one leg in one of the slots in said tape, said leg engaging said tape and functioning to hold said switch section in a closed position until said tape moves and a slot comes opposite said leg, whereupon said switch section will swing to an open position and move said leg into said slot.

6. A world clock including a casing having a window in the front, a transparent glass pane closing said window, a map of the world positioned flatwise against said window, a second transparent glass pane functioning to hold said map in place, a third transparent glass pane spaced inwardly from the second-mentioned glass pane for resisting the passage of heat to said map, a plurality of electric lamps between said third glass pane and the back of the casing for illuminating said map, an endless hour tape having legends thereon indicating hours, means for supporting and guiding said tape adjacent the upper edge of said map so that part of the tape will be seen through said window and the remaining part will be in back of the window, and electrically actuated means for moving said tape intermittently, said means functioning once each hour.

7. A world clock as set forth in claim 6, in which a colored panel is provided in back of said tape and in front of said lamps, said colored panel being slightly larger than said legends and positioned in back of the path of travel of said legends and also in a selected time zone for specially distinguishing said time zone.

8. A world clock including a casing having a glass closed window, a map of the world filling said window, a plurality of parallel rows of lamps in said casing for illuminating said map, an endless hour tape having hour legends thereon positioned to move along the upper edge of said map, means for moving said tape intermittently to agree with the rotation of the earth, means for periodically supplying current to said lamps, and adjustable means cooperating with said lamps for providing greater illumination of certain parts of said map at certain times during the year than at other times.

9. A world clock as set forth in claim 8, in which said adjustable means comprises opaque division walls, there being one division wall between the respective rows of lamps, a frame member connecting all said division walls so that they will move as a unit and a hand-actuated rock shaft extending through and secured to all said division walls nearer one end thereof than the other whereby when said division walls are tilted to obstruct the light from some of said lamps there will be less spread of illumination on said map and when moved to present the least obstruction to the light from said lamps there will be the greatest spread of illumination on said map.

10. A world clock including a casing having a window, a map of the world positioned in said window flatwise, means in said casing for illuminating said map, an hour tape positioned at the upper edge of said map for indicating the time of day over the entire earth, means for causing said tape to move at the same mean speed as the earth, a pair of groups of lamps for indicating the minutes of each hour, one of said groups functioning to indicate units and the other tens, and means for supplying said groups of lamps with electric current, said means for each group including a rotatable switch drum having a cam thereon for each of the lamps of the group with which it is associated, a brush for each cam, said brushes being electrically connected respectively to a lamp in the group with which it is associated, said cams being arranged to engage said brushes in successive order to light the lamps in an order to present numbers and time-controlled means for rotating said drums a certain distance each minute.

11. A world clock as set forth in claim 10, characterized by having the drum associated with the group of lamps indicating tens formed with a plurality of cams arranged so that each ten minutes a sufficient number of brushes will be closed by the cams to change the lighting of the group of lamps to indicate a new number and thereby indicate the fact that ten minutes have passed.

12. A world clock as set forth in claim 10, characterized by having the drum associated with the group of lamps indicating units formed with a plurality of cams arranged so that one or more cams will function each minute to close one or more switches to change the lighting of the lamps of the group with which they are associated whereby the group of unit lamps will present a new number each minute.

13. The combination with a geographical clock including a flat translucent geographical map of the earth of electrical-mechanical means for illuminating and darkening said map in simulation of daylight and darkness occurring throughout the earth in accordance with the movement of the earth in relation to the sun.

14. The combination with a geographical clock including a flat stationary translucent geographical map of the earth, of electrical-mechanical means for illuminating and darkening said map in simulation of daylight and darkness occurring throughout the earth in accordance with the movement of the earth in relation to the sun.

15. The combination with a geographical clock including a translucent geographical map of the earth, of electrical-mechanical means including distinctively contrasting lamps for illuminating and darkening said map in simulation of daylight and darkness occurring throughout the earth in accordance with the movement of the earth in relation to the sun.

16. The combination with a geographical clock including a flat translucent geographical map of the earth, of electrical-mechanical means for illuminating and darkening said map in simulation of daylight and darkness occurring throughout the earth in accordance with the movement of the earth in relation to the sun, said means being operatively connected with said clock for operation in synchronism therewith.

17. The combination with a geographical clock including a flat translucent geographical map of the earth, of electrical-mechanical means for illuminating and darkening said map in simulation of daylight and darkness occurring throughout the earth in accordance with the movement of the earth in relation to the sun, and means for modifying the normal lighting effect of said means.

18. The combination with a geographical clock including a flat translucent geographical map of the earth, of electrical-mechanical means operated by said clock for illuminating and darkening said map in simulation of daylight and darkness occurring throughout the earth in accordance with the movement of the earth in relation to the sun.

19. The combination with a geographical clock including a translucent geographical map of the earth, of electrical-mechanical means for illuminating and darkening said map in simulation of daylight and darkness occurring throughout the earth in accordance with the movement of the earth in relation to the sun, said means including rows of lamps arranged behind said map and each of said rows consisting of lamps having distinctively contrasting lighting effect.

MAUD MAE CLOUGH.